United States Patent [19]
Conrad

[11] 3,724,585
[45] Apr. 3, 1973

[54] FLUID STEERING SYSTEM

[75] Inventor: Marcus L. Conrad, Stevensville, Mich.

[73] Assignee: Clark Equipment Company, Buchanan, Mich.

[22] Filed: Apr. 15, 1971

[21] Appl. No.: 134,164

Related U.S. Application Data

[63] Continuation of Ser. No. 516,249, Dec. 27, 1965, abandoned.

[52] U.S. Cl. .................................................180/79.2 C
[51] Int. Cl. ......................................................B62d 5/06
[58] Field of Search ........180/79.2 R, 79.2 B; 280/91

[56] References Cited

UNITED STATES PATENTS

| | | | |
|---|---|---|---|
| 3,087,564 | 4/1963 | Quayle | 180/79.2 |
| 3,185,245 | 5/1965 | Hoyt | 280/91 |
| 3,202,238 | 8/1965 | Strader | 180/79.2 |
| 3,265,146 | 8/1966 | Tucker | 280/91 X |
| 3,305,041 | 2/1967 | Schramm | 180/79.2 |

*Primary Examiner*—Kenneth H. Betts
*Attorney*—Kenneth C. Witt, John C. Wiessler, Robert J. Norton and Lewis J. Lamm

[57] ABSTRACT

A steering system for achieving three different steering modes, having double acting fluid actuating means for pivoting the front wheels, additional double acting fluid actuating means for pivoting the rear wheels and operative control means for admitting pressurized fluid to and discharging fluid from the fluid actuator means. Two wheel steering is achieved in the usual manner. For conventional four wheel steering, the two fluid actuator means are connected in circuit in a manner that movement of the operator's control means directs pressurized fluid into one of the fluid actuator means, the fluid discharged from the said one actuator means entering the other fluid actuator means and the fluid discharged from the other fluid actuator means returning to the said operator's control means. When four wheel crab steering is desired, the system is first operated in the same manner as for conventional four wheel steering to get one pair of wheels to a desired angle after which the fluid actuator means for such pair of wheels is bypassed and the wheels are held in the selected pivoted position after which the operator's control means is turned in the opposite direction to pivot the other pair of wheels through the straight-ahead position and on to a position in which the other pair of wheels is in an attitude approximately parallel to the said one pair of wheels.

5 Claims, 4 Drawing Figures

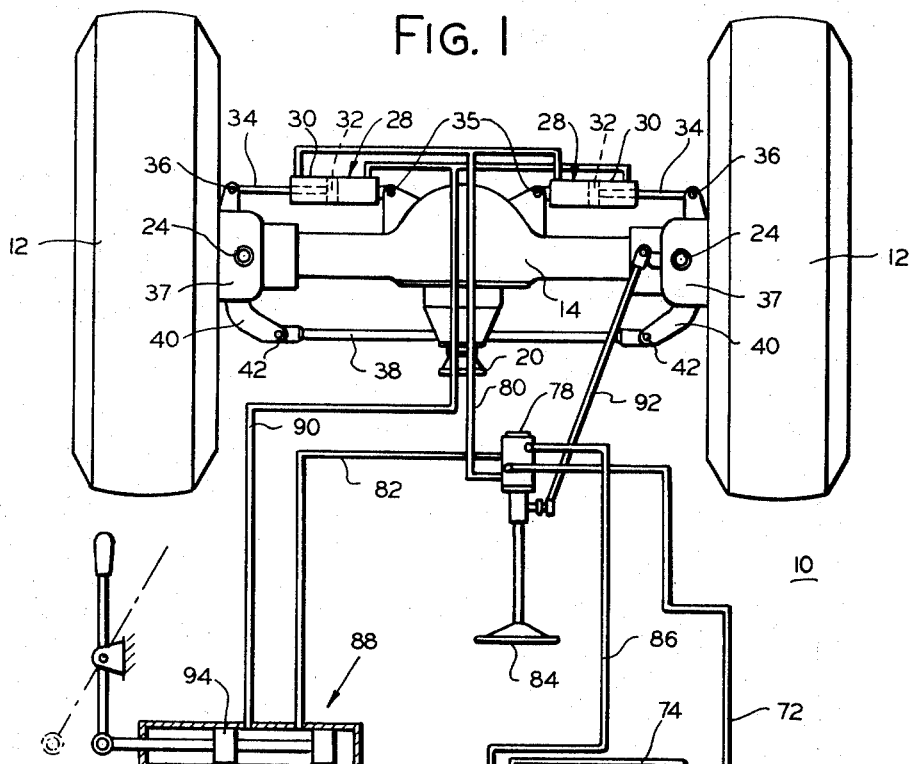
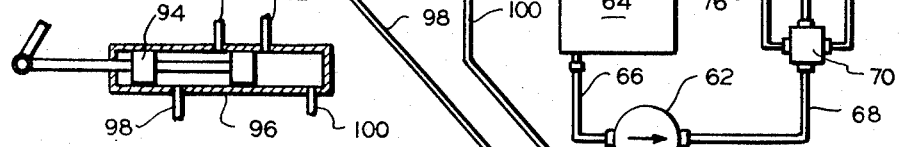
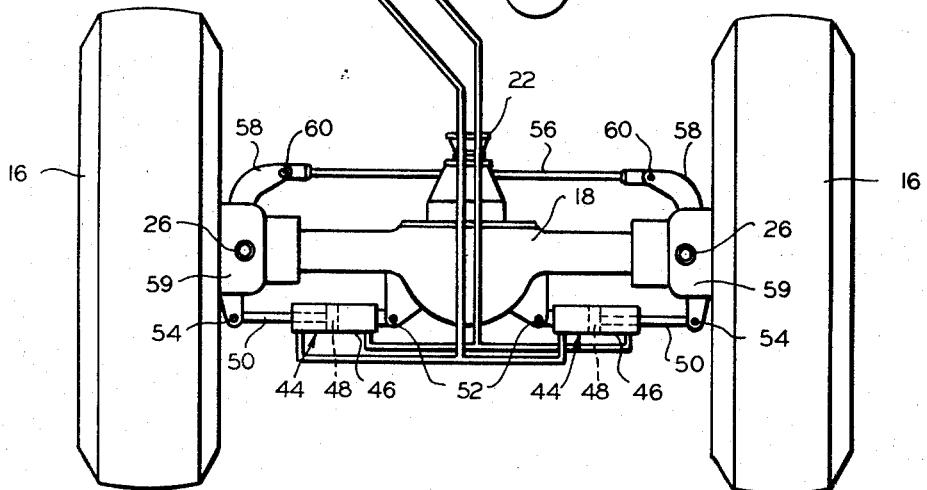

PATENTED APR 3 1973

INVENTOR
MARCUS L. CONRAD
BY Kenneth C. Witt
ATTORNEY

FLUID STEERING SYSTEM

This application is a continuation of copending application Ser. No. 516,249 filed Dec. 27, 1965, now abandoned.

This invention relates to fluid steering systems and more particularly to a steering system for a four wheel vehicle which provides two wheel steering, four wheel steering or crab steering. By crab steering is meant oblique or lateral steering wherein all of the wheels of the vehicle are turned simultaneously in the same direction with the result that the vehicle moves sidewise without changing its heading.

The object of this invention is a steering system which provides the three steering modes mentioned in a simpler manner than other similar steering systems heretofore known, thereby to reduce the complexity and cost of equipping vehicles with such a system and facilitating the operation and maintenance of the steering system.

In carrying out my invention in one preferred form thereof, I provide a steering system for a four wheel vehicle which has a pair of double acting fluid actuators for turning the two wheels at one end of the vehicle, a second pair of double acting fluid actuators for turning the two wheels at the other end of the vehicle, a source of pressurized fluid, and an operator's steering device connected for admitting pressurized fluid from the source for operating the said fluid actuators. The steering system includes a pair of fluid lines connected between the operator's steering device and the first pair of fluid actuators for transmitting fluid therebetween, a two-position valve connected in one of the said fluid lines, and a second pair of fluid lines connected between the two-position valve and the second pair of actuators for transmitting fluid therebetween. In one position the two-position valve bypasses the second pair of fluid actuators and provides for two wheel steering, while in the second position it connects the second pair of actuators in circuit with the first pair and provides four wheel steering. Crab steering may also be obtained in the manner which is described in detail hereinafter.

For a clearer and more complete understanding of my invention reference should be had to the accompanying drawing wherein:

FIG. 1 is a partially schematic view illustrating a preferred form of my steering system, FIG. 1A is a view of the two-position valve of the system in the other position.

Figure 3:
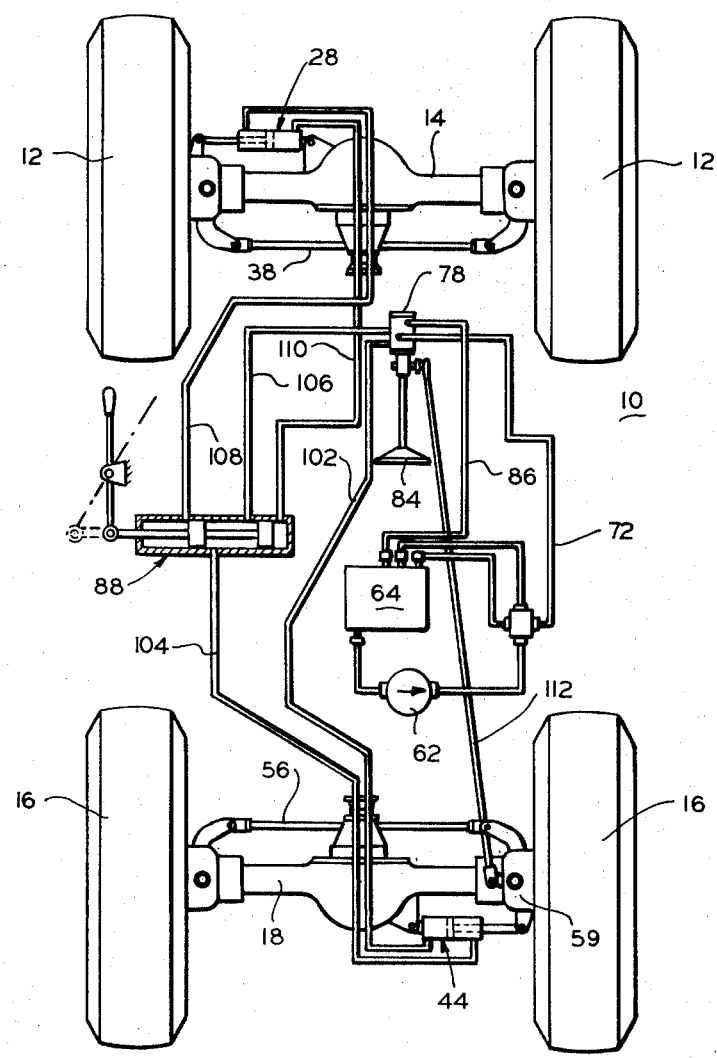
FIG. 3 is a partially schematic view illustrating a second preferred form of my steering system.

Referring to FIG. 1 of the drawing, I have indicated generally by the numeral 10 a four wheel rubber-tired vehicle although only the wheels, axles and steering system of the vehicle are illustrated. The vehicle includes a pair of front wheels 12 carried by an axle 14, and a pair of rear wheels 16 carried by an axle 18. In the typical vehicle illustrated all four wheels are drive wheels, being connected for operation by a prime mover (not shown) through a suitable power train (also not shown) including a transmission and interconnecting shafts which are connected to coupling member 20 for axle 14 and coupling member 22 for axle 18.

Axles 14 and 18 are both combined driving and steering axles similar to those shown and described in greater detail in U.S. Pat. No. 2,945,544 Jacobus, dated July 19, 1960, which is assigned to the same assignee as the present invention, however, it will be readily understood that the present invention is not limited to use with such an axle structure. The wheels 12 are mounted at the ends of axle 14 for rotation about a horizontal axis or axes and pivotal movement about vertical axes 24, while wheels 16 are mounted at the ends of axle 18 for rotation about a horizontal axis or axes and pivotal movement about vertical axes 26.

A pair of double-acting piston and cylinder actuators 28 are utilized for pivoting the wheels 12 on axle 14. Each of these actuators, as shown in FIG. 1, comprises a cylinder 30 and a piston 32 therein mounted on piston rod 34. These two actuators are arranged in oppositely disposed or push-pull relation, with the cylinders 28 connected at locations 35 to the housing of axle 14 and the piston rods 34 pivotally connected at pivot points 36 to pivoted portions 37 of the axle on which the wheels are mounted. A tie rod 38 connects projections 40 on the pivoted portions 37 of the axle, this tie rod being connected between points 42 and 42 on the respective projections. The manner in which these parts are arranged in the illustration of FIG. 1 provides a fluid-mechanical balance which equalizes the turning forces on the two wheels in both directions of turn, causes both wheels to pivot the correct amount for a turn in either direction, and also assures prompt and proper realignment of the wheels in the event that one of them is knocked out of alignment, and these features are explained in greater detail in the aforementioned patent.

The rear wheels 16 are operated by actuators which are the same as those which operate the front wheels, except that the actuators for the rear wheels are behind the axle instead of in front so that operation of the actuators in a given sense produces pivoting of the wheels in the opposite direction. As illustrated in FIG. 1, the actuators for the rear wheels are indicated generally by the numerals 44, the cylinders are indicated by the numerals 46, the pistons by the numerals 48 and the piston rods by the numerals 50. The cylinders are connected at locations 52 to the axle housing and the piston rods are connected at 54 to the pivoted portions 59 of the axles on which the wheels 16 are mounted. A tie rod 56 connects the projections 58 on the pivoted portions 59 of the axle between pivot points 60 and 60 on the respective projections.

The fluid system includes a pump 62 which is driven by the prime mover of the vehicle in the customary manner. This pump draws fluid from a reservoir or sump 64 through a suction line or conduit 66 and discharges fluid under pressure into a conduit 68. The numeral 70 indicates a regulator or relief device which maintains a predetermined flow in fluid conduit 72 while allowing excess fluid to return to the reservoir 64 through conduit 74; and device 70 also limits the pressure in conduit 72 to a predetermined value, the overflow returning to the reservoir through conduit 76. Line 72 supplies fluid under pressure to a control device 78 which is a valve mechanism of known type and admits fluid under pressure to conduit 80 when the operator's steering wheel 84 is turned in one direction from a neutral position, and admits fluid under pressure to a conduit 82 when the operator's steering wheel is turned in the other direction. Conduit 86 provides for return of fluid to the reservoir 64.

Figure 2:
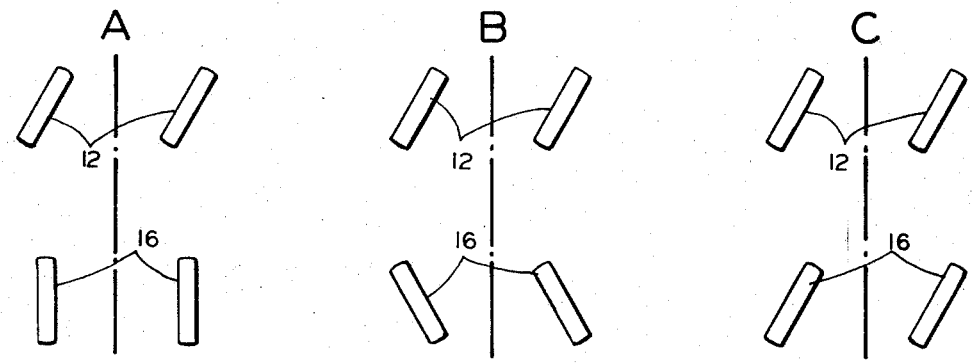
FIG. 2 is a schematic view illustrating the three different steering modes available with this system.

Conduit 80 is connected to the head end of right actuator 28 and to the rod end of left actuator 28. Thus, when operator's steering wheel 84 is turned clockwise (looking forwardly at the steering wheel in FIG. 1) the right actuator 28 is extended and the left actuator 28 is contracted, and continued operation of the steering wheel 84 in this direction moves both of the front wheels 12 to the positions indicated in FIG. 2A. Operation of the steering wheel 84 in the opposite direction admits fluid under pressure to conduit 82. This conduit conducts the fluid through a two-position valve 88 when it is in the position shown in FIG. 1, and thence through a conduit 90 to the rod end of the right actuator 28 and the head end of the left actuator 28 to move the front wheels 12 in the opposite direction. It will be understood that when fluid line 80 is connected to the source of fluid pressure that the fluid line 82, 90 is connected to bleed, i.e., to return fluid to the reservoir through conduit 86, while when line 82, 90 is connected to the source of pressure the line 80 is connected to bleed. It will be understood also by those familiar with fluid steering circuits of this type that rod 92 which is connected between the right pivoted portion of the front axle and the steering device 78 provides a follow-up connection which acts to stop pivoting action of the wheels when turning of the operator's steering wheel 84 ceases. That is, rod 92 tends to restore equilibrium in the control device 78.

When it is desired to provide four wheel steering two-position valve 88 is moved to the other position. That is, spool 94 of this valve is moved inside cylinder 96 from its right-hand position of FIG. 1 to the left-hand position of FIG. 1A, as illustrated schematically on the drawing. It will be readily appreciated that this provides a fluid connection between the actuators for the two axles by way of conduit 90 and a conduit 98; and it also connects conduit 82 and a conduit 100. With the system in this condition, turning of the operator's steering wheel 84 in the clockwise direction as described previously still directs pressurized fluid through a conduit 80 to the head end of the right actuator 28 and the rod end of the left actuator 28. Operation of these actuators expels fluid from the opposite end of both actuators which is directed through conduit 90 and conduit 98 to the rod end of left actuator 44 and the head end of right actuator 44. This contracts left actuator 44 and extends right actuator 44 and turns the two rear wheels 16 simultaneously with the front wheels 12. Continued operation in this direction will result in the four wheels assuming the positions illustrated in FIG. 2B. It will be understood that the fluid which was expelled from the opposite ends of the actuators 44 is returned through conduits 100, 82 and 86 to the reservoir 64. It will also be understood that operation of the operator's steering wheel in the opposite direction causes all four wheels to pivot in the opposite direction respectively.

When crab steering is desired, the two-position valve 88 is left in the position of FIG. 1A and if crab steering to the right is desired the operator's steering wheel is turned counterclockwise until the rear wheels have turned the desired amount to the right. Then, valve 88 is moved to the position of FIG. 1 and the operator's steering wheel is turned clockwise until the front wheels assume approximately the same angle to the right as the rear wheels, at which time they may be in the position illustrated in FIG. 2C, and the vehicle may then be operated obliquely to the right if going forward or to the left if going backward. It will be understood, of course, that crab steering in the opposite direction can be achieved by the opposite of the operation described. Similarly, the rear wheels can be restored to a straight-ahead position by putting the two-position valve back in the position of FIG. 1A and turning the operator's steering wheel in a suitable manner until the rear wheels are restored to the desired position. If desired a mechanical latch (not shown) or other equivalent device may be provided to latch the rear wheels in a straight-ahead position when it is not desired to use them for either four-wheel or crab steering.

In FIG. 3 of the drawing is illustrated a fluid steering system embodied in a vehicle in which the rear wheels are utilized when two wheel steering is desired instead of the front wheels as in FIG. 1. Also, the vehicle of FIG. 3 utilizes a single actuator for each of the axles for pivoting the wheels which are mounted thereon instead of the double actuators of FIg. 1. In the vehicle of FIG. 3 the single actuator for each axle must provide sufficient force to pivot both of the wheels, and it will be understood that the wheel which is not connected to an actuator, that is, the left rear wheel and the right front wheel, are operated by means of the respective tie rods. When actuator 44 pivots right rear wheel 16 the tie rod 56 causes left rear wheel 16 to pivot also, and when actuator 28 causes the left front wheel 12 to pivot the tie rod 38 causes the right front wheel 12 to pivot also. The arrangement shown in FIG. 3 is more adaptable for smaller vehicles because the tie rods and other parts must be much heavier relative to other parts of the vehicle if only single actuator steering is used. With larger vehicles these tie rods and other parts generally get so large and cumbersome that it is preferable to use the double actuator arrangement of FIg. 1.

In FIG. 3, the parts are the same as in FIG. 1 except as indicated on the drawing and explained hereinafter. The same reference numerals have been used for corresponding parts in FIG. 3 as in FIG. 1, although some of the less important reference numerals have been omitted from FIG. 3 in the interest of simplifying this figure of the drawing.

When it is desired to provide two wheel steering with the system of FIG. 3, the two position valve 88 is located in the position shown in this figure. Then, if the operator turns the steering wheel 84 clockwise pressurized fluid is admitted by device 78 through conduit 102 to the left or head end of actuator 44. This extends actuator 44 and pivots both of the rear wheels 16 so that they point left, and consequently, if the vehicle is moving forwardly it will steer to the right. The fluid discharged from the rod end of actuator 44 flows through conduit 104, valve 88 and conduit 106 to the device 78 and thence through conduit 86 back to the reservoir 64.

When the valve 88 is in the other position operation of the steering wheel 84 in the manner described results in the discharge from the rod end of actuator 44 of fluid through conduit 104, through valve 88 and thence through conduit 108 to the rod end of actuator 28. This contracts actuator 28 and causes the front portions of the front wheels 12 to pivot to the right and thus provide four wheel steering to the right (the same as FIG. 2B). The discharge from actuator 28 flows through a conduit 110 and thence through the valve 88 and conduit 106 to the device 78 and back through conduit 86 to the reservoir 64. In this system a rod 112 is connected between the right pivoted portion 59 of the rear axle 18 and steering device 78 to provide a follow-up connection to make the steering system responsive to the amount of operator's steering wheel 84.

Crab steering can be obtained in the system of FIG. 3 in a similar manner to the system of FIG. 1, that is, by turning the operator's steering wheel counterclockwise first if crab steering to the right is desired, with the two-position valve 88 in the other position (as shown in FIG. 1A). Then, after the front wheels have thus been angled to the right, the valve 88 is moved to the position shown in FIG. 3 and the operator's steering wheel turned clockwise to turn the rear wheels to the right also. The four wheels may then be in a position similar to that illustrated in FIG. 2C.

While I have described and illustrated my invention in certain preferred forms it will be understood that modifications may be made by those skilled in the art. Therefore, it will be understood that I intend to cover by the appended claims all such modifications which fall within the true spirit and scope of my invention.

I claim:

1. The method of steering a four wheel land vehicle having first double acting fluid actuator means for pivoting the front wheels, second double acting fluid actuator means for pivoting the rear wheels and operator control means for admitting pressurized fluid to and discharging fluid from the fluid actuator means, the method comprising connecting both fluid actuator means in circuit in a manner such that movement of the operator control means directs pressurized fluid into one of the fluid actuator means, the fluid discharged from the said one fluid actuator means entering the other fluid actuator means and the fluid discharged from the said other fluid actuator means returning to the operator control means, whereby conventional four wheel steering with the front and rear wheels pivoting in opposite directions is accomplished and when four wheel crab steering is desired the preceding step is carried out and continued until one pair of wheels is pivoted at the desired angle after which the fluid actuator means for said one pair of wheels is bypassed and the operator control means is then turned in the opposite direction to pivot the other pair of wheels through the straight ahead position and on to a position in which the said other pair of wheels is in an attitude approximately parallel to the said one pair of wheels.

2. A steering system for a four wheel land vehicle having a pair of front wheels which pivot in unison and a pair of rear wheels which pivot in unison, comprising first double acting fluid actuator means for pivoting the front wheels, second double acting fluid actuator means for pivoting the rear wheels, operator control means for admitting pressurized fluid to and discharging fluid from the said fluid actuator means, conduits connecting both said fluid actuator means in circuit in a manner such that movement of the operator control means directs pressurized fluid into one of the said fluid actuator means, the fluid discharged from the said one fluid actuator means entering the other fluid actuator means and the fluid discharged from the said other fluid actuator means returning to the said operator control means, whereby conventional four wheel steering with the front and rear wheels pivoting in opposite directions is accomplished, and means for bypassing the fluid actuator means for the wheels at one end of the vehicle and holding them in a selected pivoted position when the four wheel crab steering is desired, the system first being operated in the manner previously described with both said fluid actuator means in circuit to pivot the said one pair of wheels to a desired angle with respect to the straight ahead position after which the said bypass means for the said one pair of wheels is operated to remove the fluid actuator means for the said one pair of wheels from the fluid circuit and hold such pair of wheels at the said angle after which the said operator control means is turned in the opposite direction to pivot the said other pair of wheels through the straight ahead position and on to a position in which the other pair of wheels is in an attitude approximately parallel to the said one pair of wheels.

3. A steering system as specified in claim 2 in which the said first fluid actuator means comprises a single double-acting fluid actuator, and the said second fluid actuator means also comprises a single double-acting fluid actuator.

4. A steering system as specified in claim 2 in which the said first fluid actuator means comprises a pair of double-acting fluid actuators connected respectively for pivoting the two wheels at the said one end of the vehicle, and the said second fluid actuator means comprises a second pair of double-acting fluid actuators connected respectively for pivoting the two wheels at the other end of the vehicle.

5. A steering system as specified in claim 2 in which the said means for bypassing the fluid actuator means for the wheels at one end of the vehicle and holding them in a selected pivoted position comprises a two position valve.

* * * * *